(12) United States Patent
Webb et al.

(10) Patent No.: US 11,084,340 B2
(45) Date of Patent: Aug. 10, 2021

(54) HITCH ASSEMBLY FOR ARTICULATED MACHINES

(71) Applicant: Caterpillar SARL, Geneva (CH)

(72) Inventors: Adrian Jarrod Webb, Peoria, IL (US); James White, Loughborough (GB)

(73) Assignee: Caterpillar SARL, Geneva (CH)

( * ) Notice: Subject to any disclaimer, the term of this patent is extended or adjusted under 35 U.S.C. 154(b) by 494 days.

(21) Appl. No.: 16/035,892

(22) Filed: Jul. 16, 2018

(65) Prior Publication Data
US 2019/0039424 A1 Feb. 7, 2019

(51) Int. Cl.
| | |
|---|---|
| *B60D 1/02* | (2006.01) |
| *E02F 9/00* | (2006.01) |
| *E02F 9/08* | (2006.01) |
| *F16B 21/12* | (2006.01) |
| *F16B 21/14* | (2006.01) |

(52) U.S. Cl.
CPC .............. *B60D 1/025* (2013.01); *E02F 9/006* (2013.01); *E02F 9/0841* (2013.01); *F16B 21/12* (2013.01); *F16B 2021/14* (2013.01)

(58) Field of Classification Search
CPC ........ B60D 1/025; E02F 9/006; E02F 9/0841; F16B 21/12; F16B 2021/14
See application file for complete search history.

(56) References Cited

U.S. PATENT DOCUMENTS

| | | | | |
|---|---|---|---|---|
| 3,410,009 A | * | 11/1968 | Martin | E02F 3/64 37/418 |
| 3,521,720 A | * | 7/1970 | Korotkin | B62D 53/021 180/265 |
| 3,843,160 A | * | 10/1974 | Frushour | B60D 1/025 280/416.1 |
| 4,890,684 A | * | 1/1990 | Simmons | B62D 12/00 180/419 |
| 4,966,242 A | * | 10/1990 | Baillargeon | B62D 53/021 180/242 |
| 5,186,483 A | * | 2/1993 | Sheppard | B60D 1/00 280/492 |

(Continued)

FOREIGN PATENT DOCUMENTS

| | | |
|---|---|---|
| CN | 204749763 U | 6/2002 |
| CN | 201884448 U | 6/2011 |
| GB | 2551319 A | 3/2003 |

OTHER PUBLICATIONS

European Search Report for Application No. PCT/EP2016-08050; report dated Feb. 24, 2017.

*Primary Examiner* — Jacob D Knutson
*Assistant Examiner* — Conan D Duda

(57) ABSTRACT

A hitch assembly adapted to facilitate an articulation of a second frame relative to a first frame of an articulated machine includes a housing, a shaft member, and a pin member. The housing has a cavity, and is adapted to be coupled to the first frame through first fasteners. The shaft member has a through-hole and is received into the cavity, and is rotatable relative to the cavity and the housing to facilitate an oscillation of the second frame relative to the first frame. The pin member is received into the through-hole, and is rotatable relative to the through-hole and the shaft member to facilitate the articulation of the second frame relative to the first frame. The pin member is adapted to be coupled to the second frame through second fasteners.

17 Claims, 5 Drawing Sheets

(56) References Cited

U.S. PATENT DOCUMENTS

| | | | |
|---|---|---|---|
| 5,632,350 A * | 5/1997 | Gauvin | B60D 1/00 180/14.4 |
| 6,402,177 B1 | 6/2002 | Carmona et al. | |
| 6,533,061 B1 | 3/2003 | Fairless et al. | |
| 6,932,373 B2 * | 8/2005 | Seebohm | B62D 12/00 280/442 |
| 8,002,074 B2 * | 8/2011 | Roose | B62D 12/00 180/418 |
| 8,469,622 B2 * | 6/2013 | McClanahan | F16B 19/00 403/154 |
| 8,534,415 B2 * | 9/2013 | Roose | B62D 12/00 180/418 |
| 8,726,465 B2 * | 5/2014 | Schmehr | F16C 11/045 16/367 |
| 8,875,817 B2 | 11/2014 | Giles-Brown et al. | |
| 9,630,664 B2 * | 4/2017 | Hellholm | B62D 55/0655 |
| 9,828,046 B2 * | 11/2017 | Hellholm | B60P 3/41 |
| 10,030,693 B2 * | 7/2018 | Stolz | F16G 15/06 |
| 10,131,380 B1 * | 11/2018 | Simmons | B62D 53/021 |
| 10,160,489 B2 * | 12/2018 | Hellholm | B60P 3/41 |
| 2011/0113952 A1 * | 5/2011 | Rosenwasser | F41H 5/026 89/36.02 |
| 2012/0299265 A1 * | 11/2012 | King | B60G 21/0553 280/124.136 |
| 2014/0037234 A1 * | 2/2014 | Van Dyke | F16C 17/10 384/154 |
| 2015/0115559 A1 * | 4/2015 | Begenau | B60G 9/003 280/124.106 |
| 2016/0152103 A1 * | 6/2016 | Ye | B60D 1/143 280/512 |
| 2016/0312830 A1 * | 10/2016 | Prozeller, Jr. | F16C 33/60 |
| 2017/0066359 A1 * | 3/2017 | Rissman | F16C 11/045 |
| 2019/0039424 A1 * | 2/2019 | Webb | F16B 21/12 |
| 2019/0105955 A1 * | 4/2019 | Crane | B60D 1/01 |
| 2020/0378093 A1 * | 12/2020 | Wells | E02F 9/2841 |

* cited by examiner

HITCH ASSEMBLY FOR ARTICULATED MACHINES

CROSS-REFERENCE TO RELATED APPLICATION

This application claims priority under 35 USC § 119 and the Paris Convention to United Kingdom Application No. 1712350.6 filed on Aug. 1, 2017.

TECHNICAL FIELD

The present disclosure relates in general to hitch assemblies in machines. More particularly, the present disclosure relates to a hitch assembly that facilitates both an articulation and an oscillation between an engine end frame and a non-engine end frame of a machine.

BACKGROUND

Machines, such as the ones that apply a split chassis for supporting a first machine part and a second machine part, generally use hitch assemblies to provide a degree of movement (or rotation) between the first machine part and the second machine part. Conventional hitch assemblies used in such machines are generally known to facilitate articulation and oscillation between said two machine parts. Articulation generally allows the machine to be steered over an expanse of a worksite, while oscillation allows the machine to be moved over uneven surfaces, accommodating undulations of the worksite.

A general practice of assembling hitch assemblies to such machines includes extensively and precisely machining portions of at least one of the said machine parts. Such practice consumes time, effort, and capital. Moreover, a typical process for a disassembly of such hitch assemblies from such machines, for service and/or repairs, for example, is laborious and time consuming as well. This is because a disassembly process may involve removing certain components surrounding the hitch assemblies, including the machine's operator cab. Further, it is imperative to regularly apply a lubricant to one or more moving components of such hitch assemblies, which undesirably increases operator effort.

U.S. Pat. No. 8,875,817 ('817 reference) discloses a hitch assembly having a yoke portion, a tube portion, a driveshaft, and a hitch carrier to rotationally support the driveshaft inside the tube portion and having first holes. The '817 reference further discloses that the hitch assembly may have fasteners to connect the hitch carrier to the tube portion via the first holes, and a thrust collar to threadingly engage a periphery of the hitch carrier and having second holes. A number of the second holes is greater than a number of the first holes.

SUMMARY OF THE INVENTION

In one aspect, the present disclosure relates to a hitch assembly for an articulated machine. The articulated machine includes a first frame and a second frame. The hitch assembly is adapted to facilitate an articulation of the second frame relative to the first frame. The hitch assembly includes a housing, a shaft member, and a pin member. The housing has a cavity, and is adapted to be coupled to the first frame through a set of first fasteners. The shaft member has a through-hole and is at least partly received into the cavity. The shaft member is rotatable relative to the cavity and the housing to facilitate an oscillation of the second frame relative to the first frame. Further, the pin member is at least partly received into the through-hole. The pin member is rotatable relative to the through-hole and the shaft member to facilitate the articulation of the second frame relative to the first frame. The pin member is adapted to be coupled to the second frame through a set of second fasteners.

In another aspect, the disclosure relates to an articulated machine. The articulated machine includes an engine end frame (EEF), a non-engine end frame (NEEF), a hitch assembly that facilitates a coupling of the NEEF to the EEF. The hitch assembly includes a housing, a shaft member, and a pin member. The housing includes a cavity, and is adapted to be coupled to the EEF through a set of first fasteners. The shaft member includes a through-hole and is at least partly received into the cavity. Further, the shaft member is rotatable relative to the cavity and the housing to facilitate an oscillation of the NEEF relative to the EEF. The pin member is at least partly received into the through-hole. The pin member is rotatable relative to the through-hole and the shaft member to facilitate an articulation of the NEEF relative to the EEF. The pin member is adapted to be coupled to the NEEF through a set of second fasteners.

DETAILED DESCRIPTION

Reference will now be made in detail to specific embodiments or features of the present disclosure, examples of which are illustrated in the accompanying drawings. Generally, corresponding reference numbers will be used throughout the drawings to refer to the same or corresponding parts. Also, wherever possible, the same reference numbers will be used throughout the drawings to refer to the same, or the like parts.

Figure 1:
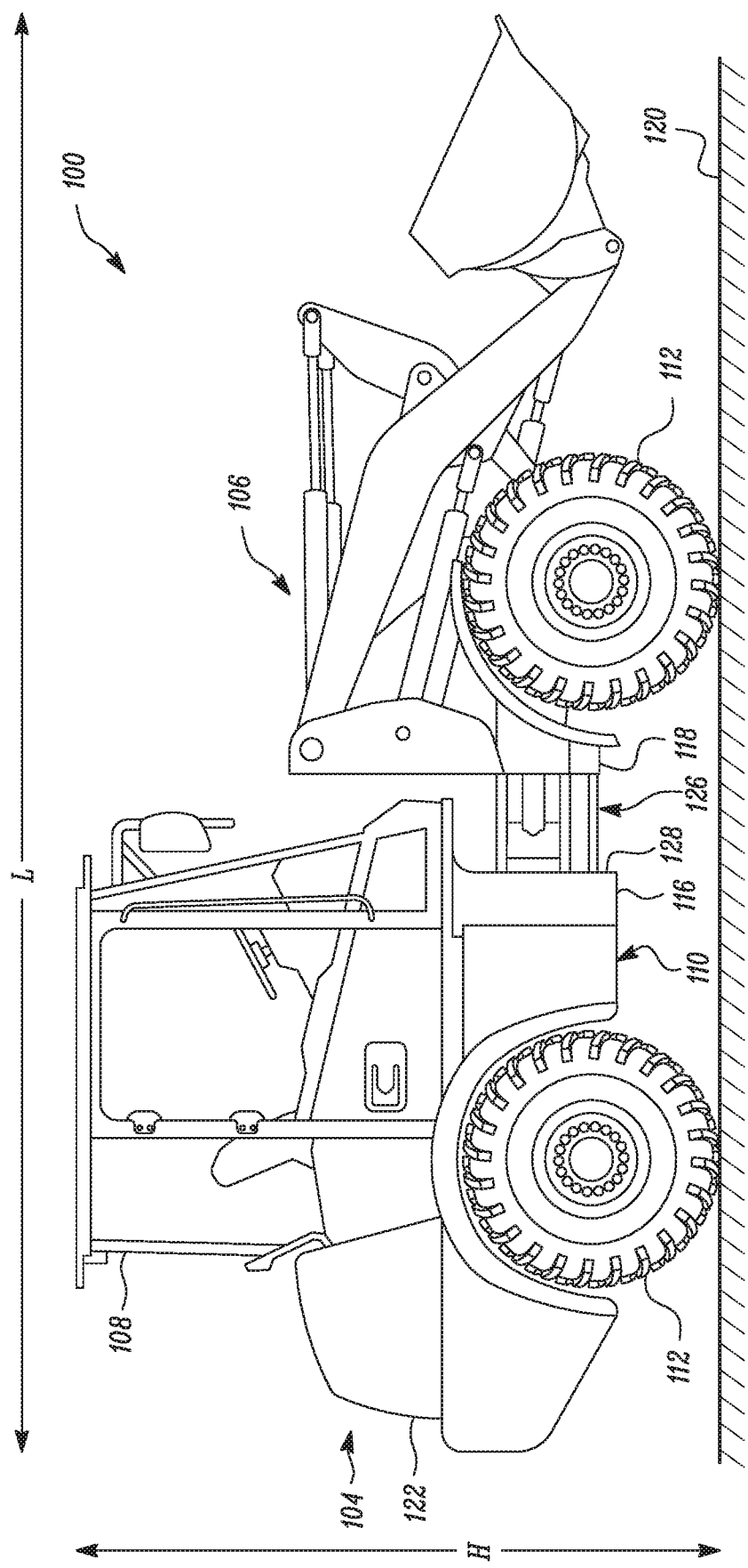
FIG. 1 is a side view of an exemplary articulated machine, in accordance with an embodiment of the disclosure.

Referring to FIG. 1, an exemplary articulated machine 100 is shown. The articulated machine 100 may be referred to as a machine 100. The machine 100 may be applied in construction, forestry, excavation, waste management, agriculture, and mining operations, among some possible fields of use. In the exemplary embodiment, the machine 100 is illustrated as a wheel loader, although it is possible for the machine 100 to be functionally implemented as any other articulated machine. For example, the machine 100 may include, but may not be limited to, articulated trucks, compactors, etc., which may serve in one or more of the above noted fields. Machines having a trailer configuration may also suitably employ one or more aspects of the present disclosure. The machine 100 includes a length, L, and a height, H.

Figure 2:
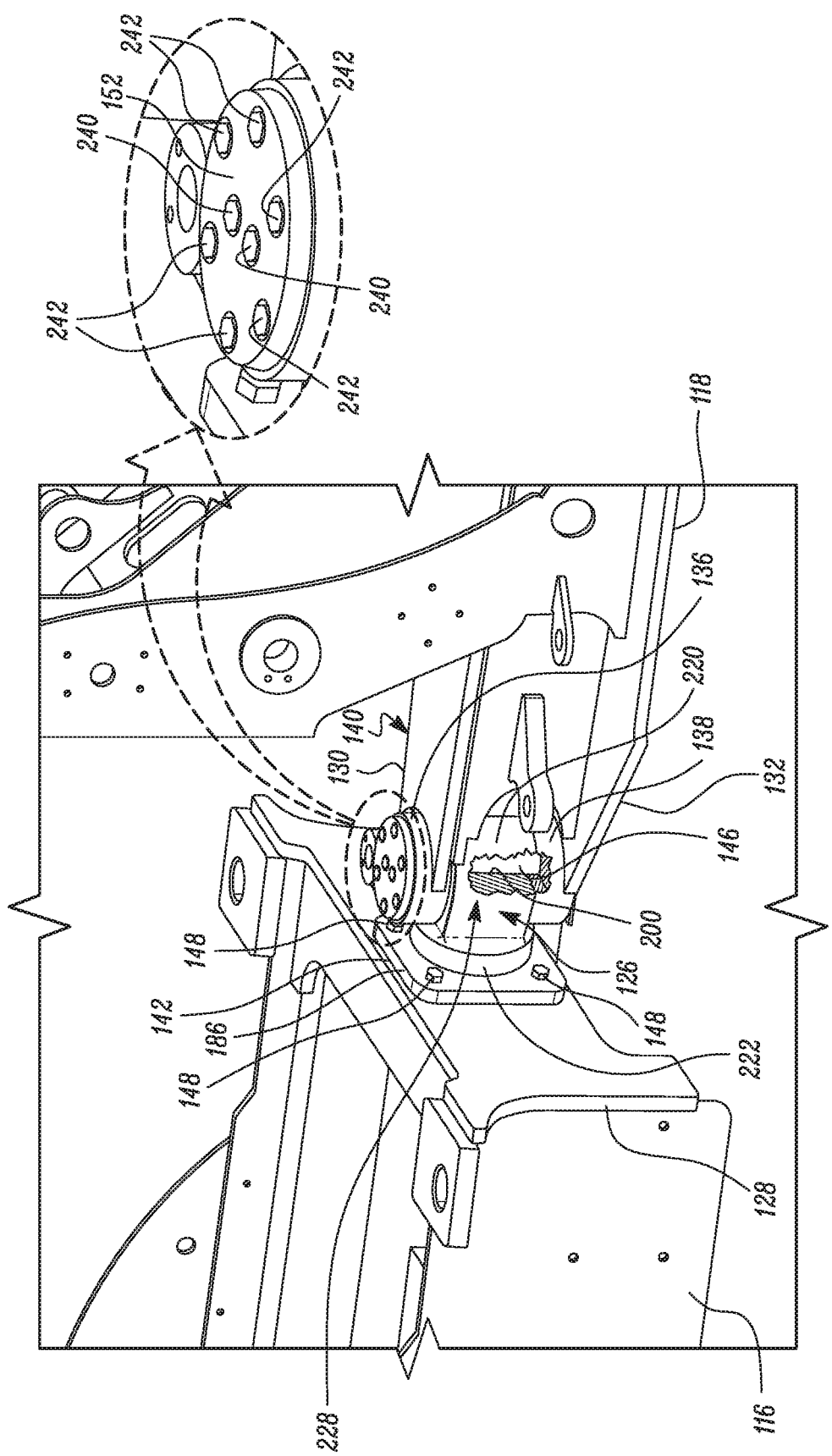
FIG. 2 is an enlarged perspective view of a portion of the articulated machine of FIG. 1, illustrating a hitch assembly being adapted to couple a first machine part and a second machine part of the articulated machine, in accordance with an embodiment of the disclosure.
Figure 4:
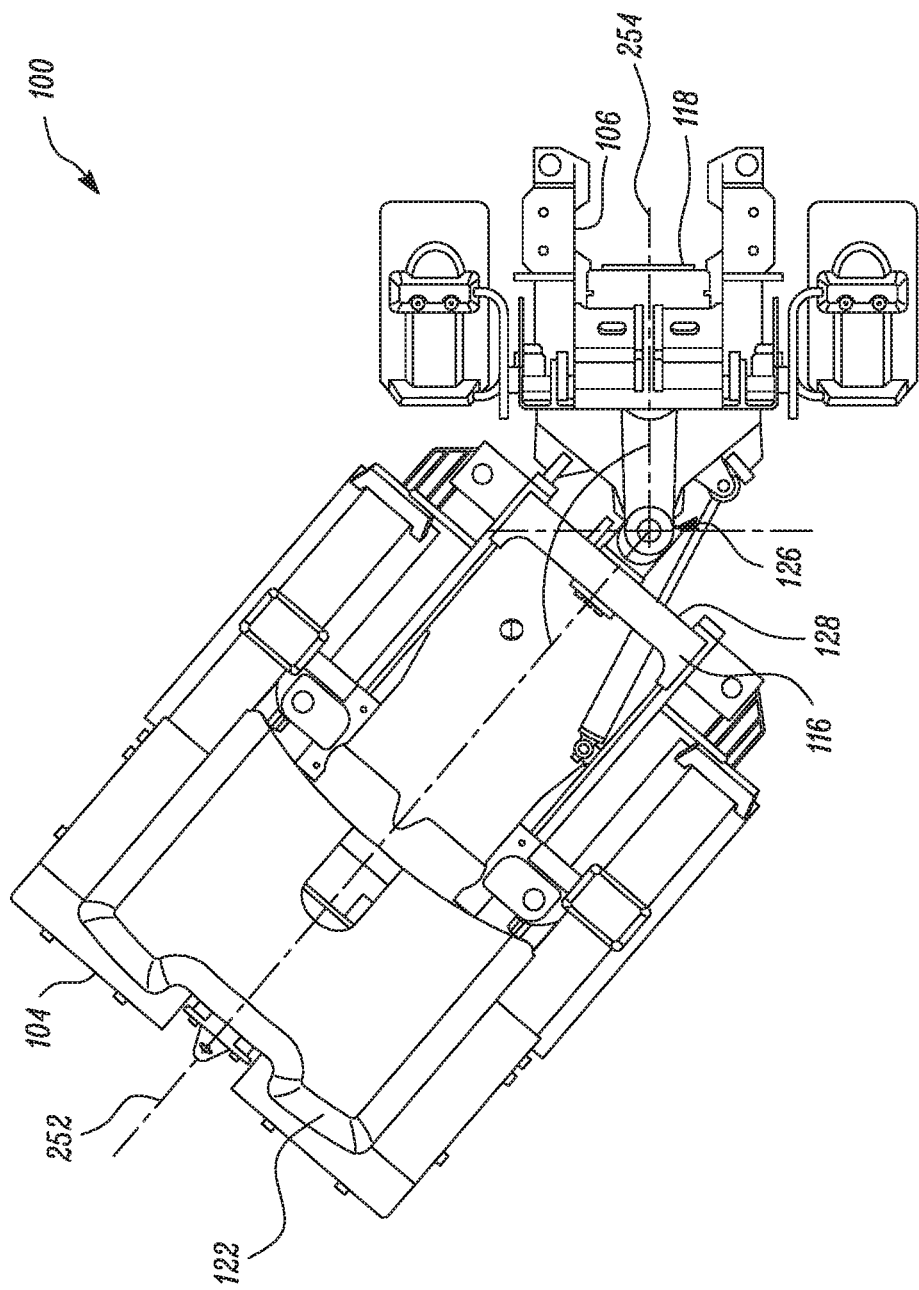
FIG. 4 is a plan view of the articulated machine of FIG. 1, illustrating an exemplary articulated position of the articulated machine by use of the hitch assembly of FIG. 2, with one or more components of the articulated machine being removed, in accordance with an embodiment of the disclosure.
Figure 5:
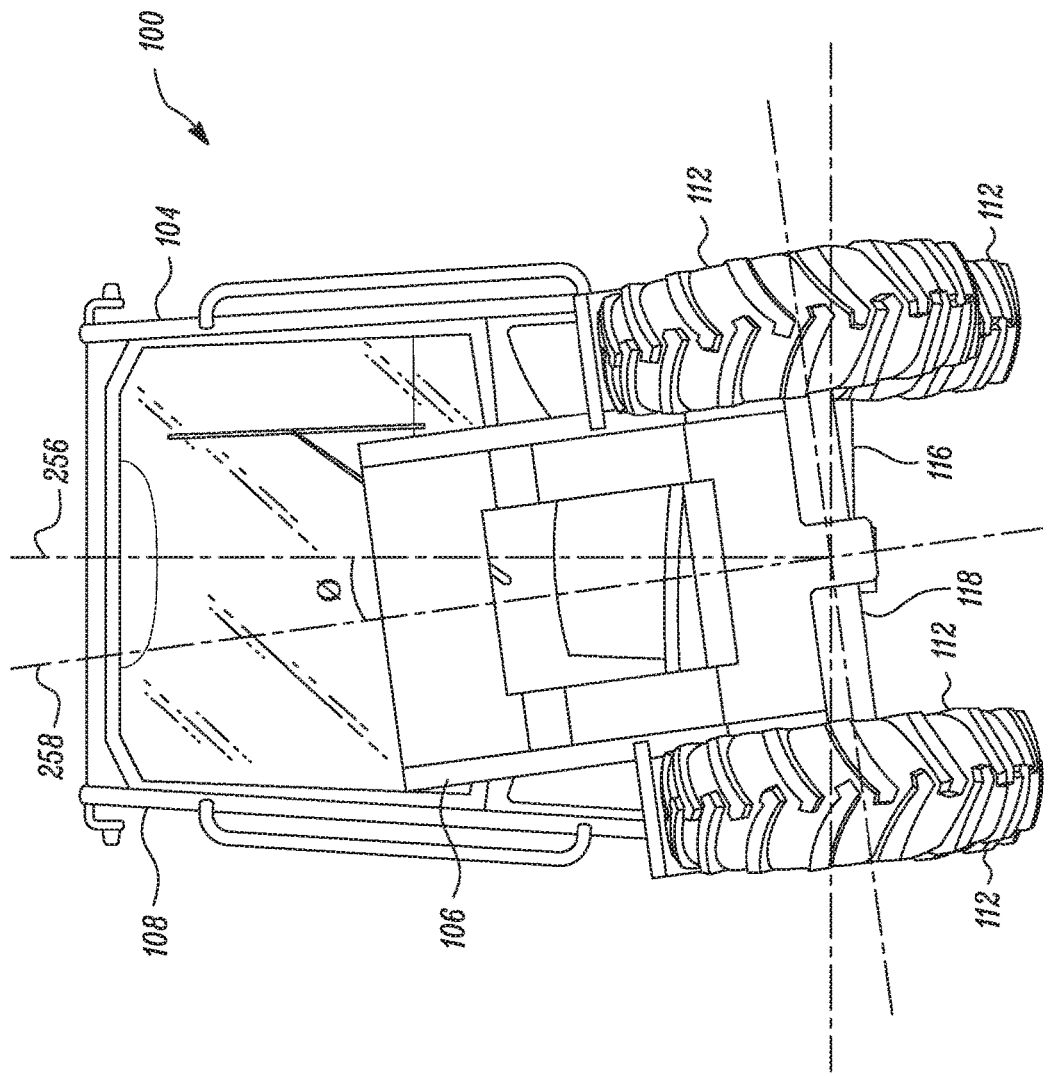
FIG. 5 is a front view of the articulated machine of FIG. 1, illustrating an exemplary oscillated position of the articulated machine by use of the hitch assembly of FIG. 2, with one or more components of the articulated machine being removed, in accordance with an embodiment of the disclosure.

Referring to FIGS. 1 and 2, the machine 100 includes a first machine part 104 and a second machine part 106, and said machine parts 104, 106 is capable for an articulation and oscillation relative to each other, according to one or more aspects of the present disclosure (see example depictions provided in FIGS. 4 and 5). Said articulation and oscillation may be performed about different axes (discussed later). To this end, the machine 100 includes a two-part frame system or a split chassis system 110 that supports both the first machine part 104 and the second machine part 106 atop respective sets of wheels 112. In particular, the split chassis system 110 includes a first frame 116 (also shown in FIG. 2) to support the first machine part 104 on a first set of wheels 112, and a second frame 118 (also shown in FIG. 2) to support the second machine part 106 on a second set of wheels 112. The sets of wheels 112 facilitate a travel of the machine 100 from one location to another. In some implementations, it is possible for the machine 100 to use crawler tracks in place of wheels, or a combination of crawler tracks and wheels to facilitate machine travel.

The first machine part 104 corresponds to a portion of the machine 100 that houses a power source (not shown) and an operator cab 108 of the machine 100. The power source may be an internal combustion engine that may help to power one or more functionalities of the machine 100, such as operations including a travel of the machine 100 over and across a work surface 120. To this end, the first machine part 104 includes an engine compartment 122 to house the internal combustion engine, and because the first machine part 104 houses the internal combustion engine, the first frame 116 (see FIG. 2), associated with the first machine part 104, is an engine end frame (EEF) of the machine 100.

The second machine part 106 is devoid of any power source, and corresponds to a portion of the machine 100 that performs a designated work, such as modifying the work surface 120. To this end, the second machine part 106 includes a work tool 124, such as a grapple, bucket, grader, etc., that may receive power from the internal combustion engine housed within the engine compartment 122 of the first machine part 104, to perform said work. Because the second machine part 106 is devoid of the power source (i.e. the internal combustion engine), the second frame 118, associated with the second machine part 106, is a non-engine end frame (NEEF) of the machine 100.

The machine 100 includes a hitch assembly 126 that facilitates a coupling of the first frame 116 to the second frame 118, and thus a coupling of the first machine part 104 to the second machine part 106. In particular, the hitch assembly 126 facilitates an oscillation of the second frame 118 relative to the first frame 116, and also an articulation of the second frame 118 relative to the first frame 116. In so doing, the hitch assembly 126 in turn facilitates the oscillation and the articulation between the first machine part 104 and the second machine part 106, as has been discussed above.

Figure 3:
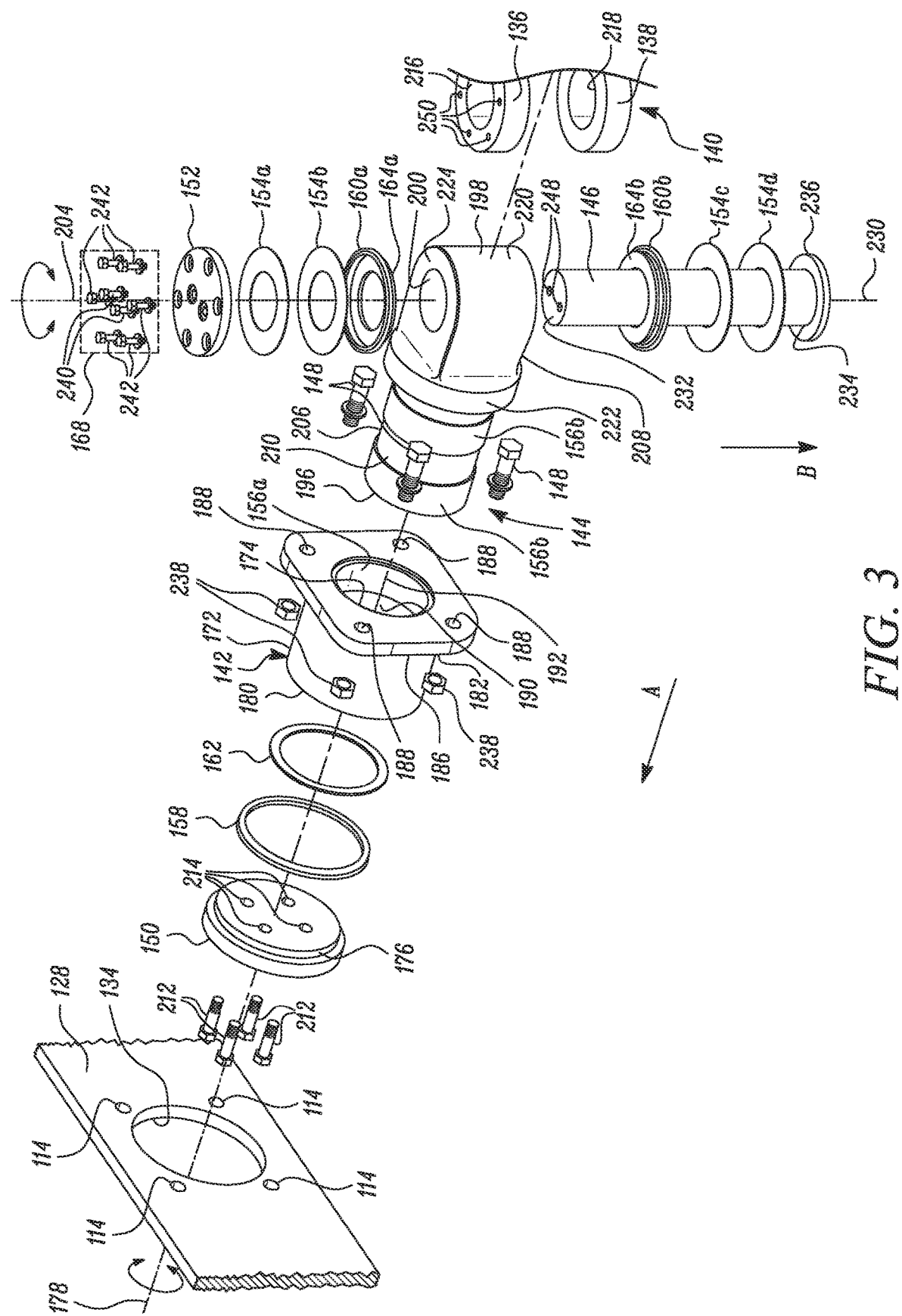
FIG. 3 is an exploded view of the hitch assembly of FIG. 2.

Referring to FIGS. 2 and 3, the first frame 116 may be fabricated from a number of components, as is well known, and out of said number of components, the first frame 116 includes a support plate 128, as illustrated. A slot 134 (see FIG. 3) is formed in the support plate 128. The slot 134 receives a portion of the hitch assembly 126. The support plate 128 also includes one or more holes 114 (see FIG. 3) formed around the slot 134 to receive fasteners (discussed later) for an assembly of the hitch assembly 126 to the support plate 128, and, in turn, to first frame 116 (this aspect of a joint between the hitch assembly 126 and the first frame 116 will be discussed later). Further, as shown in FIGS. 2 and 3, the second frame 118 includes a yoke 140 that extends from an end of the second frame 118. The yoke 140 includes a first arm 130 and a second arm 132 that facilitate a coupling of the second frame 118 to the first frame 116 through the hitch assembly 126. The first arm 130 and the second arm 132 includes a first clasp 136 and a second clasp 138, respectively, purposes of which will be divulged later in the application.

The hitch assembly 126 includes a housing 142, a shaft member 144, and a pin member 146. The hitch assembly 126 also includes a variety of supplementary components that facilitate an assembly of the housing 142, the shaft member 144, and the pin member 146, to each other, so as to configure and set up the hitch assembly 126. These supplementary components include a retainer plate 150, a lock plate 152, a number of shims 154a, 154b, 154c, 154d (or collectively shims 154), a number of bearings 156a, 156b, a first seal 158, a second seal 160a, a third seal 160b, a first thrust washer 162, a second thrust washer 164a, a third thrust washer 164b, a set of first fasteners 148, and a set of second fasteners 168. Details pertaining to these supplementary components and an assemblage of the hitch assembly 126 facilitated by these supplementary components will be set out further below.

The housing 142 coupled to the first frame 116 through the first fasteners 148. The housing 142 includes a body 172 that has a cylindrical shape, and includes a cavity 174 defined and extended along a full length of the body 172 (best shown in FIG. 3). As with the shape of the body 172, the cavity 174 includes a cylindrical shape as well, and defines a linear axis 178, and, accordingly, there is defined a first axial end 180 and a second axial end 182 of the body 172. Although the body 172 has a cylindrical shape, it is possible that the body 172 may include a variety of other shapes, such as a cuboidal shape, an elliptical shape, an irregular shape, or any shape that may compliment an immediate surrounding of the body 172. Further, the housing 142 includes a flange 186 structured at the second axial end 182, and into which the cavity 174 extends without interruption. In an implementation, the flange 186 may be integrally formed with the body 172, although it is possible for the flange 186 to be coupled to the body 172 through welding, or by other known fastening means. In one implementation, the flange 186 may extend and be defined in a plane that is perpendicular to the linear axis 178. Further, the flange 186 includes one or more fastener holes 188 so as to receive the first fasteners 148 and so as to be coupled to the first frame 116 of the machine 100. In an embodiment, the first fasteners 148 are threaded fasteners, such as bolts.

In an implementation, at least one bearing, referred to as a first bearing 156a, of the number of bearings 156a, 156b, may be inserted into the cavity 174, such as by press-fitting, and be abutted and retained against a wall 190 of the cavity 174. The first bearing 156a may facilitate a movement (or a rotation about the linear axis 178) of a member that may be positioned within the cavity 174, relative to the cavity 174 and the housing 142. Such a member may be the shaft member 144, as may be noted from the description further below. In one implementation, more than one first bearings 156a may be applied within the cavity 174. Additionally, the first bearing 156a may be a non-metallic bearing which may have self-lubricating properties. For example, the first bearing 156a may be made from a composite material including cotton fabric, asbestos, or other fillers bonded with phenolic resin. Similarly, plastics, such as acetal, nylon, Polytetrafluoroethylene (PTFE), carbon graphite, etc., may also be used to produce the first bearing 156a.

The shaft member 144 is at least partly received into the cavity 174, and is rotatable relative to the cavity 174 and the housing 142. The shaft member 144 defines a first axis 192, and in an assembly of the shaft member 144 with the housing 142, the first axis 192 may be in line with the linear axis 178 defined by the cavity 174. The shaft member 144 includes a first shaft end 196 and a second shaft end 198. The first shaft end 196 is opposed (i.e. lies axially oppositely) to the second shaft end 198. Further, the shaft member 144 includes a through-hole 200 formed and defined at the second shaft end 198. The through-hole 200 defines a through-hole axis 204, and in one implementation, the through-hole axis 204 is perpendicular to the first axis 192.

In one implementation, and according to the depicted embodiment, the shaft member 144 is broadly categorized into two separate parts, namely a first part 206 and a second part 208. Although such a categorization is disclosed, it may be noted that the first part 206 and the second part 208 of the shaft member 144 may be integrally formed to define the shaft member 144, in its entirety, and it is only to define specific features of the shaft member 144 that such a categorization is attested to in this present disclosure.

The first part 206 of the shaft member 144 includes an elongated body 210 that may compliment a confine or the cylindrical shape of the cavity 174, and, accordingly, may be received into the cavity 174. Given that the elongated body 210 compliments the cylindrical shape of the cavity 174, the elongated body 210 of the first part 206 of the shaft member 144 may include a cylindrical profile as well, thus allowing the rotation of the elongated body 210, and of, in turn the shaft member 144, relative to the cavity 174 and the housing 142. In assembly, the first part 206 of the shaft member 144 may be inserted and pushed into the cavity 174, so that the first shaft end 196 is revealed at the first axial end 180 through the cavity 174 of the housing 142. Thereafter, the first part 206 is secured and be retentively coupled to the housing 142 by mounting the retainer plate 150 to the first shaft end 196. In one example, the retainer plate 150 is circular and has a diameter that is larger than a diameter of a cross-section of the cavity 174. In assembly, therefore, the retainer plate 150 may abut against the first axial end 180 of the body 172 to retentively couple and secure the shaft member 144 within the cavity 174, and thus, to the housing 142. In so doing, the retainer plate 150 limits any substantial axial movement (i.e. along the first axis 192) of the shaft member 144. However, at the same time, the shaft member 144 remains free for a rotation about the first axis 192. It may be noted that such a rotation facilitates an oscillation of the second frame 118 relative to the first frame 116 about the first axis 192.

In one implementation, the retainer plate 150 is coupled and mounted to the first shaft end 196 by fasteners 212 via holes 214, and thus, the first shaft end 196 (i.e. defined at an end of the first part 206) includes fastener receiving holes to receive said fasteners 212—although these holes are not explicitly shown, a visualization of a layout of these holes is possible by viewing FIG. 3, and by viewing holes 214 formed in the retainer plate 150 and also by viewing the fasteners 212 that secure the retainer plate 150 to the first shaft end 196 through the holes 214.

In certain implementations, at least one bearing, referred to as a second bearing 156b, of the number of bearings 156a, 156b may be mounted and retained, such as by press-fitting, to the first part 206 of the shaft member 144, so as to facilitate a rotation of the shaft member 144 relative to the cavity 174 of the housing 142. It may be understood that a form and function of the second bearing 156b, and a material applied for the second bearing 156b, may remain similar to what has been described for the first bearing 156a. As may be seen in the depicted embodiment in FIG. 3, two second bearings 156b have been provided over the first part 206 of the shaft member 144. Nevertheless, it will be understood that more or less number of the second bearing 156b may be provided over the first part 206 of the shaft member 144, than what has been disclosed.

The first thrust washer 162 and the first seal 158 may be positioned at an interface between the retainer plate 150 and the first axial end 180 of the body 172, as shown. In assembly, the first thrust washer 162 rests directly against the first axial end 180 of the body 172, while the first seal 158 rests over the first thrust washer 162, although a reverse positioning, i.e. to have the first seal 158 rest against the first axial end 180, and to have the first thrust washer 162 rest over the first seal 158, is possible. In one example, an assembly of the first thrust washer 162 and the first seal 158 may be mounted to an exemplary stepped seat 176 formed on the retainer plate 150, and then an assembly of the retainer plate 150 to the first axial end 180 is carried out. By having the assembly of the first thrust washer 162 and the first seal 158 positioned between the retainer plate 150 and the first axial end 180, a direct contact between the retainer plate 150 and the first axial end 180 of the housing 142 is restricted, minimizing a possibility of retainer plate wear (and also a wear at the first axial end 180). Moreover, the first seal 158 may disallow dirt and dust to enter into the interface between the retainer plate 150 and the first axial end 180, isolating the cavity 174 from an outside environment.

The second part 208 of the shaft member 144 includes the through-hole 200, a swivel hub 220 formed around the through-hole 200, and a stopper flange 222. The second part 208 of the shaft member 144 may remain outside the housing 142 upon a complete assembly of the hitch assembly 126. The swivel hub 220 may take a cylindrical profile with an axis defined by the swivel hub 220 falling in line with, or being the same as, the through-hole axis 204. It may be noted that the swivel hub 220 may have a cylindrical profile, although other shapes and profiles of the swivel hub 220 may be contemplated. It is possible that the swivel hub 220 assumes a shape that is complimentary to an immediate surrounding of the swivel hub 220, so as to also refrain from interfering with any component located in an immediate environment surrounding the swivel hub 220, during a working of the hitch assembly 126. As may be seen from FIG. 3, an orientation of the cylindrical profile of the swivel hub 220, surrounding the through-hole 200, differs from an orientation of the cylindrical profile of the elongated body 210 of the first part 206 of the shaft member 144. According to the depicted implementation, the cylindrical profile of the swivel hub 220 is defined perpendicularly in relation to the cylindrical profile of the elongated body 210 of the first part 206. The swivel hub 220 also includes a first hub end 224 and a second hub end 226, as annotated in FIG. 3.

The stopper flange 222 is formed at an interface defined between the swivel hub 220 and the elongated body 210, and helps refrain an insertion of the shaft member 144 into the cavity 174 beyond the first part 206, during assembly. For example, when fully assembled, the stopper flange 222 of the second part 208 of the shaft member 144 may abut and rest against the flange 186 of the housing 142, leaving the swivel hub 220, and the stopper flange 222 itself, exposed to the environment surrounding the hitch assembly 126. In certain implementations, the stopper flange 222 may be circular in shape, although a variation to this shape is possible. For example, the stopper flange 222 may take a rectangular shape, or a square shape, an irregular shape, a shape similar to a shape of the flange 186, or any shape that may suit an environment around the shaft member 144.

In structure and profile, the swivel hub 220 may be integrated with the stopper flange 222, and similarly, the stopper flange 222 may also seamlessly and contiguously merge and be integrated with the elongated body 210 of the first part 206. To this end, the shaft member 144 may be made by casting a high grade molten metal, or an alloy of one or more metals, for example, in the same mold, and may accordingly be formed as a wholly integral unit. Understandably, therefore, the first axis 192 of the shaft member 144 disclosed above, may be common to both the first part 206 and the second part 208 of the shaft member 144.

The pin member 146 facilitates a coupling between the shaft member 144 and the second frame 118 of the machine 100 (see FIG. 2). The pin member 146 is elongated and includes a cylindrical profile as well, and is at least partly received into the through-hole 200 of the shaft member 144, for assembly. The pin member 146 defines a second axis 230 and is rotatable relative to the through-hole 200, and thus, is rotatable relative to the shaft member 144, as well. In an assembly of the pin member 146 within the through-hole 200, the second axis 230 may fall in line with the through-hole axis 204, and thus, the second axis 230 may be perpendicular to the first axis 192.

The pin member 146 includes a first end 232, a second end 234, and a base plate 236 coupled to the second end 234. The pin member 146 is coupled to the yoke 140 (and therefore to the second frame 118) through the second fasteners 168. In particular, the first end 232 of the pin member 146 is coupled to the yoke 140 through the second fasteners 168. For a comprehensive understanding of an arrangement of the pin member 146 relative to the hitch assembly 126 and the second frame 118, FIGS. 2 and 3 need to be viewed in cohesion. Although not explicitly shown in FIG. 3, but which may be understood from FIG. 2, the pin member 146 extends from the second arm 132 to the first arm 130 of the yoke 140 in assembly, and at a region of an extension of the pin member 146 between the first arm 130 and the second arm 132, the pin member 146 is inserted and engaged within the through-hole 200 of the swivel hub 220, and is free to rotate within the through-hole 200 of the swivel hub 220.

For understanding a coupling of the pin member 146 to the second frame 118, the second fasteners 168 are further grouped into first group fasteners 240 and second group fasteners 242. The first group fasteners 240 facilitate a coupling of the lock plate 152 to the first end 232 of the pin member 146, while the second group fasteners 242 facilitate a coupling of the lock plate 152 to the first arm 130 via holes 250 (or to the first clasp 136 of the first arm 130) of the yoke 140 extending from the second frame 118 (best seen in FIGS. 2 and 3). In that way, the pin member 146 is coupled (or fixedly engaged) to the second frame 118 by the second fasteners 168, while being free to rotate relative to the through-hole 200 about the through-hole axis 204. In an embodiment, and as with the first fasteners 148, the second fasteners 168 are threaded fasteners, such as bolts, as well.

With the base plate 236 being coupled to the second end 234 and the lock plate 152 being coupled to the first end 232, an axial movement (i.e. along the second axis 230) of the pin member 146 is restricted. Nevertheless, with a rotation of the pin member 146 within the through-hole 200, an articulation of the second frame 118 relative to the first frame 116 of the machine 100, about the second axis 230, is facilitated. Optionally, a seal (not shown) may be positioned in between the lock plate 152 and the first clasp 136 of the first arm 130. In one embodiment, the base plate 236 and the pin member 146 may be integrally formed, although it is possible for the base plate 236 to be coupled to the pin member 146 by welding, or by other known fastening means, for example.

In an embodiment, the second thrust washer 164a and the second seal 160a may be assembled between the first clasp 136 and the first hub end 224 in a manner similar to what has been described for the first seal 158 and the first thrust washer 162 assembled between the retainer plate 150 and the first axial end 180 of the housing 142. The second thrust washer 164a and the second seal 160a may have a functioning that remain similar to what has been already discussed of the first thrust washer 162 and the first seal 158, respectively. Similarly, the third thrust washer 164b and the third seal 160b may be positioned between the second clasp 138 and the second hub end 226 in a manner similar to what has been described for the first thrust washer 162 and the first seal 158 assembled between the retainer plate 150 and the first axial end 180 of the housing 142. As with the second thrust washer 164a and the second seal 160a, the third thrust washer 164b and the third seal 160b may have a functioning that remain similar to what has been discussed of the first thrust washer 162 and the first seal 158, respectively, as well. Accordingly, it will be understood that the second seal 160a and the third seal 160b prevent dust and elements of the outside environment from entering into the through-hole 200, while the second thrust washer 164a and the third thrust washer 164b prevent a contact of the clasps 136, 138 against the respective hub ends 224, 226, thereby mitigating wear on the clasps 136, 138 and the swivel hub 220.

INDUSTRIAL APPLICABILITY

For assembling and configuring the hitch assembly 126, an operator inserts the body 172 of the housing 142 into the slot 134 of the support plate 128 of the first frame 116 in a direction, A (FIG. 3). A full insertion of the body 172 into and through the slot 134 during assembly means that the first axial end 180 of the housing 142 has moved through and across a thickness of the support plate 128. Thereafter, the housing 142 may be mounted and fixedly secured to the support plate 128 by driving fasteners 212 through the fastener holes 188 of the flange 186, and then further into the holes 114 that surround the slot 134 on the support plate 128. The flange 186, and thus the housing 142, may be retained against the support plate 128 by securing nuts 238 to the first fasteners 148.

Thereafter, the operator may assemble the shaft member 144 to the housing 142. To do so, the operator inserts the first part 206 of the shaft member 144 into the cavity 174, and then moves the first part 206 all the way until the stopper flange 222 abuts against the flange 186. At this point, it may be understood that the first shaft end 196 has also moved across the support plate 128, in the direction, A. Moreover, at this point, the first shaft end 196 is revealed at the first axial end 180 of the housing 142 through the cavity 174. In one embodiment, the first shaft end 196 may be flush with the first axial end 180, at this stage of assembly. Accordingly, the operator arranges the retainer plate 150 against the first shaft end 196 of the shaft member 144 and aligns the holes 214 against holes that are provided at the first shaft end 196 of the shaft member 144. Fasteners 212 are then driven and tightened into the holes 214, and further driven into the holes at the first shaft end 196, thereby securing the retainer plate 150 to the first shaft end 196 of the shaft member 144. Since the retainer plate 150 may have a diameter larger than a diameter of a cross-section of the cavity 174, the retainer plate 150 facilitates a retentive coupling of the shaft member 144 within the cavity 174 of the housing 142. With such retention, however, the shaft member 144 remains free to rotate around the first axis 192.

Further, an assembly of the second frame 118 of the machine 100 to the hitch assembly 126 may be carried out, and thus the same will now be discussed. For an assembly of the hitch assembly 126 to the second frame 118, the second part 208 (or the swivel hub 220) of the shaft member 144 is inserted into a region 228 (see FIG. 2) defined between the first arm 130 and the second arm 132 of the yoke 140 such that the through-hole 200 may be aligned with retainer clasps (i.e. the first clasp 136 and the second clasp 138), or openings 216, 218 (see FIG. 3) formed within the clasps 136, 138, respectively (see FIG. 3). The operator may then insert the pin member 146 sequentially through each of the second clasp 138, the through-hole 200 of the second part 208 of the shaft member 144, and then through the first clasp 136. In so doing, the first end 232 of the pin member 146 may be revealed through the first clasp 136, and accordingly, the lock plate 152 may be brought into alignment against fastener receiving holes 248 formed on the first end 232 of the pin member 146 so that the first group fasteners 240 may be driven through the lock plate 152 and then into the pin member 146. As a result, the lock plate 152 is retained against the pin member 146, at the first end 232 of the pin member 146. Thereafter, the lock plate 152, coupled to the first end 232 of the pin member 146 by the first group fasteners 240, is also coupled to the first clasp 136 of the first arm 130 of the yoke 140 by the second group fasteners 242, thereby fixedly coupling the pin member 146 to the first arm 130, and thus to the second frame 118 of the machine 100 by the second fasteners 168. For example, the second group fasteners 242 are driven and tightened through the lock plate 152 to extend from the other end of the lock plate 152 and engage the holes 250 provided in the first clasp 136. At this state of assembly, the base plate 236 may abut against the second arm 132 (or the second clasp 138) of the yoke 140, as shown in FIG. 2.

With the lock plate 152 coupled to the first end 232 of the pin member 146 and the base plate 236 abutted to the second clasp 138, the pin member 146 is restricted from making any substantial axial movements (i.e. along the second axis 230), thereby securing and retentively coupling the pin member 146 (or the first end 232 and the second end 234 of the pin member 146) to the second arm 132 of the yoke 140, and in turn to the second frame 118 of the machine 100. Understandably, therefore, the first end 232 and the second end 234 are coupled to the yoke 140. With such retention, however, the pin member 146 remains free to rotate about the second axis 230 (or the through-hole axis 204) and facilitate articulation of the second frame 118 relative to the first frame 116.

In some embodiments, shims 154a, 154b may be positioned in between the first hub end 224 and the first clasp 136, and shims 154c, 154d may be positioned in between the second hub end 226 and the second clasp 138. Although in the depicted embodiment, i.e. of FIG. 3, two shims 154a, 154b are provided between the first hub end 224 and the first clasp 136, and two shims 154c, 154d are provided between the second hub end 226 and the second clasp 138, more or less number of shims may be applied. Additionally, it is possible for shims with varying thickness to be applied. It is also possible for one or more of the shims 154a, 154b, 154c, 154d be altogether omitted from the hitch assembly 126, in some cases.

Referring to FIGS. 4 and 5, during a travel of the machine 100 across the work surface 120, a commute between various locations may cause the second frame 118 to be articulated relative to the first frame 116 (FIG. 4), while a movement over rugged, uneven terrains may cause the second frame 118 to be oscillated relative to the first frame 116 (FIG. 5). An exemplary articulation of the second frame 118 relative to the first frame 116 is depicted in FIG. 4 by way of an illustration of a top view of the machine 100, while an exemplary oscillation of the second frame 118 relative to the first frame 116 is depicted in FIG. 5 by way of an illustration of a front view of the machine 100. It may be noted that an articulation of the second frame 118 relative to the first frame 116 occurs about the second axis 230, while an oscillation of the second frame 118 relative to the first frame 116 occurs about the first axis 192.

Owing to a split chassis system 110, each machine part 104, 106 may define a respective axis. In detail, and as shown in FIG. 4, the first machine part 104 may define a third axis 252, while the second machine part 106 may define a fourth axis 254. Both the third axis 252 and the fourth axis 254 may be defined along the length, L, (see FIG. 1) of the machine 100, such that the third axis 252 and the fourth axis 254 may fall in line (or be parallel) with each other when the machine 100 moves along a straight path. Upon an articulation (see FIG. 4), however, the fourth axis 254 may tilt and define an angle 'θ' with the third axis 252, as shown.

Similarly, the first machine part 104 may define a fifth axis 256, while the second machine part 106 may define a sixth axis 258. Both the fifth axis 256 and the sixth axis 258 may be defined along the height, H, (see FIG. 1) of the machine 100, such that the fifth axis 256 and the sixth axis 258 may fall in line with each other, or be defined in a common plane, when the machine 100 moves on and along a steady, flat path. Upon an oscillation (see FIG. 5), however, the sixth axis 258 may tilt and define an angle 'Ø' with the fifth axis 256, as shown.

With the housing 142 being fastened to the first frame 116 by first fasteners 148, instead of being welded to the first frame 116, it is easier for an operator to assemble the hitch assembly 126 to the first frame 116 and also readily remove/re-assemble the hitch assembly 126 during service and maintenance. A similar fastening configuration being provided between the pin member 146 and the second frame 118 further allows the hitch assembly 126 to be easily be mounted to and be easily removed from the second frame 118, making the hitch assembly 126 of the present disclosure more modular and flexible, ensuring an ease of use, than conventional hitch assemblies. Further, it may be noted that a removal of the pin member 146 may be performed by simply unbolting the first group fasteners 240, and then sliding the pin member 146 out of the clasps 136, 138 and out of the through-hole 200, from the other side (i.e. from the side of the second end 234 of the pin member 146)—see exemplary direction, B (FIG. 3). In an embodiment, when the base plate 236 is directed towards a bottom of the machine 100 (such as has been proposed and depicted in the present disclosure), a removal of the pin member 146 need not necessitate a removal of several other components that surround the hitch assembly 126, one pertinent component being the operator cab 108, a removal of which is tantamount to excessive time consumption and effort.

Further, it is proposed in the present disclosure, the use of self-lubricating bearings, such as bearings 156a and 156b, within the cavity 174, and/or over the shaft member 144. Such use prolongs a useful life of operation of the hitch assembly 126, minimizing repeated disassembly and re-assembly of the hitch assembly 126, in turn reducing machine downtime, labour effort, and associated costs.

It will be apparent to those skilled in the art that various modifications and variations can be made to the system of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalent.

What is claimed is:

1. A hitch assembly for an articulated machine, the articulated machine including a first frame and a second frame, the hitch assembly adapted to facilitate an articulation of the second frame relative to the first frame, the hitch assembly comprising:
   a support plate mounted to the first frame and having a slot formed therethrough;
   a housing comprising:
      a cylindrical body having a first axial end and a second axial end, and
      a flange structured at the second axial end of the cylindrical body and extending radially outward from an outer surface of the cylindrical body, the housing having a cavity defined within and extending along a full length of the cylindrical body and the flange, and the housing being attached to the first frame with the housing being inserted through the slot of the support plate and the flange being secured to the support plate by a set of first fasteners;
   a shaft member comprising:
      an elongated body having a first shaft end and a second shaft end, and
      a swivel hub structured at the second shaft end and having a through-hole defined therethrough, wherein the first shaft end of the elongated body is inserted through the cavity of the cylindrical body and the elongated body is rotatable within the cavity, the shaft member being rotatable relative to the cavity and the housing about a first axis that is perpendicular to a through-hole axis of the through-hole to facilitate an oscillation of the second frame relative to the first frame;
   a retainer plate having an outer diameter that is greater than an inner diameter of the cavity, wherein the retainer plate is coupled to the first shaft end by a plurality of fasteners extending through the retainer plate and into the first shaft end so the retainer plate engages the first axial end of the cylindrical body to retain the elongated body within the cylindrical body; and
   a pin member at least partly received into the through-hole, the pin member being rotatable relative to the through-hole and the shaft member to facilitate the articulation of the second frame relative to the first frame, wherein the pin member is attachable to the second frame through a set of second fasteners.

2. The hitch assembly of claim 1, wherein the first frame is an engine end frame (EEF) of the articulated machine and the second frame is a non-engine end frame (NEEF) of the articulated machine.

3. The hitch assembly of claim 1, wherein
   the shaft member defines the first axis, the oscillation being facilitated about the first axis, and
   the pin member defines a second axis, the articulation being facilitated about the second axis.

4. The hitch assembly of claim 3, wherein the first axis is perpendicular to the second axis.

5. The hitch assembly of claim 1, further including a bearing coupled to the shaft member, the bearing facilitating a rotation of the shaft member relative to the housing.

6. The hitch assembly of claim 5, wherein the bearing is a non-metallic bearing.

7. The hitch assembly of claim 1, further including a bearing inserted into the cavity of the housing, the bearing facilitating a rotation of the shaft member relative to the housing.

8. The hitch assembly of claim 7, wherein the bearing is a non-metallic bearing.

9. The hitch assembly of claim 1, wherein the pin member includes a first end and a second end, the first end and the second end being adapted to be coupled to a yoke extending from the second frame.

10. The hitch assembly of claim 9, wherein
    the first end is coupled to a first arm of the yoke through the set of second fasteners, and
    the pin member includes a base plate coupled to the second end, the base plate being adapted to abut against a second arm of the yoke, thereby facilitating a retentive coupling of the pin member to the yoke.

11. An articulated machine, comprising
    an engine end frame (EEF);
    a non-engine end frame (NEEF) having a yoke with a first arm and a second arm;
    a hitch assembly facilitating a coupling of the NEEF to the EEF, the hitch assembly including:
       a housing having a cavity, and being coupled to the EEF through a set of first fasteners;
       a shaft member having a first shaft end, a second shaft end, and a through-hole and being at least partly received into the cavity, the shaft member being rotatable about a first axis relative to the cavity and the housing to facilitate an oscillation of the NEEF relative to the EEF, wherein the through-hole is defined in a swivel hub at the second shaft end and has a through-hole axis that is perpendicular to the first axis, and wherein the swivel hub is disposed between the first arm and the second arm of the yoke;
       a pin member having a first pin end, a second pin end and a base plate mounted at the second pin end, wherein the first pin end is inserted through a second opening of the second arm, the through-hole and a first opening of the first arm, and wherein the base plate has an outer diameter that is greater than an inner diameter of the second opening, the pin member being rotatable relative to the through-hole and the shaft member to facilitate an articulation of the NEEF relative to the EEF; and
       a lock plate having a plate outer diameter that is greater than an inner diameter of the first opening, wherein the lock plate is fastened to the first pin end by a first group of fasteners and is fastened to the first arm by a second group of fasteners so that the base plate and the lock plate restrict axial movement of the pin member along the through-hole axis.

12. The articulated machine of claim 11, wherein the shaft member defines the first axis, the oscillation being facilitated about the first axis, and the pin member defines a second axis, perpendicular to the first axis, the articulation being facilitated about the second axis.

13. The articulated machine of claim 11, further including a bearing coupled to the shaft member, the bearing facilitating a rotation of the shaft member relative to the housing.

14. The articulated machine of claim 13, wherein the bearing is a non-metallic bearing.

15. The articulated machine of claim 11, further including a bearing inserted into the cavity of the housing, the bearing facilitating a rotation of the shaft member relative to the housing.

16. The articulated machine of claim 15, wherein the bearing is a non-metallic bearing.

17. The articulated machine of claim 11, wherein the through-hole is defined at the second shaft end, the hitch assembly further including a retainer plate adapted to be coupled to the first shaft end to retentively couple the shaft member to the housing.

* * * * *